US012314261B1

(12) United States Patent
Shih et al.

(10) Patent No.: US 12,314,261 B1
(45) Date of Patent: May 27, 2025

(54) FILTERED SEARCH METHOD

(71) Applicant: MACRONIX INTERNATIONAL CO., LTD., Hsinchu (TW)

(72) Inventors: Chih-Huai Shih, Hsinchu (TW); Han-Wen Hu, Zhubei (TW); Huai-Mu Wang, New Taipei (TW); Yung-Chun Li, Hsinchu County (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/655,472

(22) Filed: May 6, 2024

Related U.S. Application Data

(60) Provisional application No. 63/548,226, filed on Nov. 13, 2023.

(51) Int. Cl.
*G06F 16/00* (2019.01)
*G06F 16/2455* (2019.01)
*G06F 16/28* (2019.01)

(52) U.S. Cl.
CPC ........ *G06F 16/2455* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 6,122,628 A | 9/2000 | Castelli et al. | |
| 2002/0107858 A1* | 8/2002 | Lundahl | G06F 18/23 |
| 2018/0316707 A1* | 11/2018 | Dodson | H04L 43/16 |
| 2021/0374153 A1* | 12/2021 | Saxena | G06F 16/24 |
| 2022/0217061 A1 | 7/2022 | Randolph et al. | |
| 2022/0398417 A1* | 12/2022 | Zhang | G06F 18/2433 |

FOREIGN PATENT DOCUMENTS

| | | |
|---|---|---|
| TW | 410304 B | 11/2000 |
| TW | 202113625 A | 4/2021 |

* cited by examiner

*Primary Examiner* — Anhtai V Tran
(74) *Attorney, Agent, or Firm* — McClure, Qualey & Rodack, LLP

(57) ABSTRACT

A filtered search method, for performing a search within a data set, and the data set includes several data points. The filtered search method includes the following steps. Dividing the data set into several clusters based on a similarity of the data points. Dividing each of the clusters into an inlier part and an outlier part based on a distribution density of the data points. Performing a coarse search on all of the inlier parts, to filter out inlier parts of a first candidate number. Performing a fine search on the inlier parts of the first candidate number, to search data points of a second candidate number. Obtaining a search result based on the data points of the second candidate number, and the data points of the second candidate number are close to a target point.

9 Claims, 9 Drawing Sheets

FILTERED SEARCH METHOD

This application claims the benefit of U.S. provisional application Ser. No. 63/548,226, filed Nov. 13, 2023, the disclosure of which is incorporated by reference herein in its entirety.

TECHNICAL FIELD

The present disclosure relates to a search method, and in particular relates to a filtered search method performing a search based on a distribution density of a data set.

BACKGROUND

The data amount of artificial intelligence and big data is increasing rapidly, and when searching a data set with large data amount, higher search costs will be required. Clustered filtering may be performed based on a distribution characteristic of the data set, attempting to reduce the search cost. However, existing clustered filtering mechanisms are limited by a structure of the data set. When the data points in the data set have high-dimensional vectors, it is difficult to have uniformly distributed data points in each cluster.

When the number of data points in different clusters is significantly different, accuracy of the search will be greatly degraded. For example, when some clusters cover a wide range, the distance between representative points in the clusters and other data points will increase, which will degrade the accuracy of the search. Moreover, since the distribution density of data points in each cluster is significantly different, it is difficult to achieve a balance between the cluster range and the number of data points.

In view of the above issues, an improved filtered search method is needed, which can effectively search data sets with different distribution densities and has a lower search cost.

SUMMARY

According to an embodiment of the present disclosure, a filtered search method is provided. The filtered search method is for performing a search within a data set, and the data set includes several data points. The filtered search method includes the following steps. Dividing the data set into several clusters based on a similarity of the data points. Dividing each of the clusters into an inlier part and an outlier part based on a distribution density of the data points. Performing a coarse search on all of the inlier parts, to filter out inlier parts of a first candidate number. Performing a fine search on the inlier parts of the first candidate number, to search data points of a second candidate number. Obtaining a search result based on the data points of the second candidate number, and the data points of the second candidate number are close to a target point. Selectively performing a coarse search on the outlier parts, to filter out the outlier parts of a third candidate number. Performing a fine search on the outlier parts of the third candidate number, to search the data points of a fourth candidate number. Obtaining the search result based on the data points of the second candidate number and the fourth candidate number.

Figure 1A:
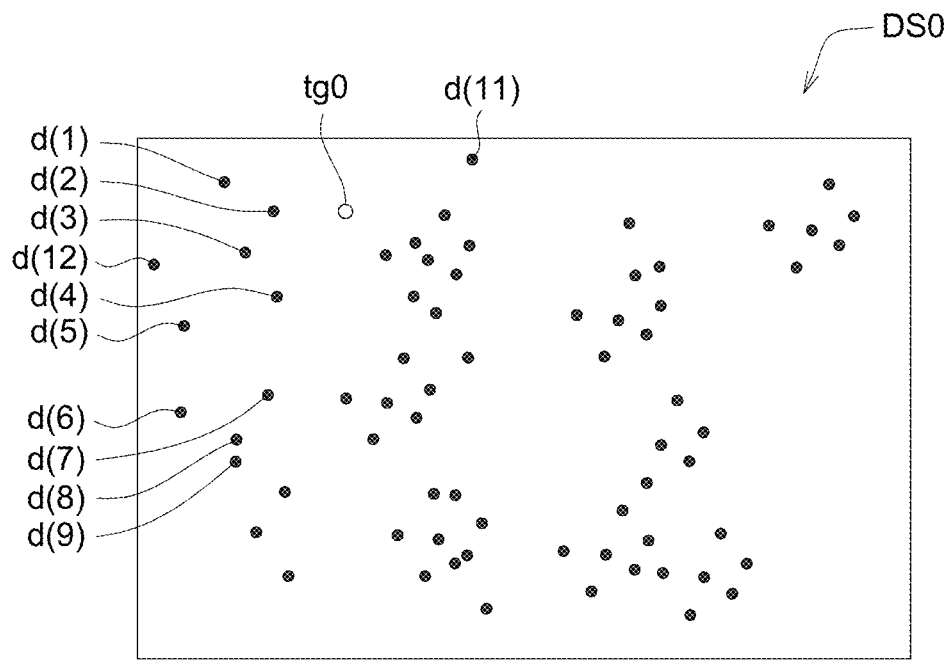
FIG. 1A is a schematic diagram of a data set according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1A is a schematic diagram of a data set DS0 according to an embodiment of the present disclosure. As shown in FIG. 1A, the data set DS0 includes several data points, such as: data point $d(1)$ to data point $d(9)$ and other data points. The data points of the data set DS0 may be non-uniformly distributed, that is, the distribution density of the data points is different. For example, the distribution density of data points $d(3)$, $d(4)$ and $d(5)$ is small, and the distribution density of data points $d(8)$ and $d(9)$ is large. The filtered search method of the present disclosure may be applied to the data set DS0, and one or more data points that meet predefined conditions are searched among the data points in the data set DS0 based on the filtered search method. For example, one or more data points closest to the target point $tg0$ are searched among the data points in the data set DS0.

Figure 1B:
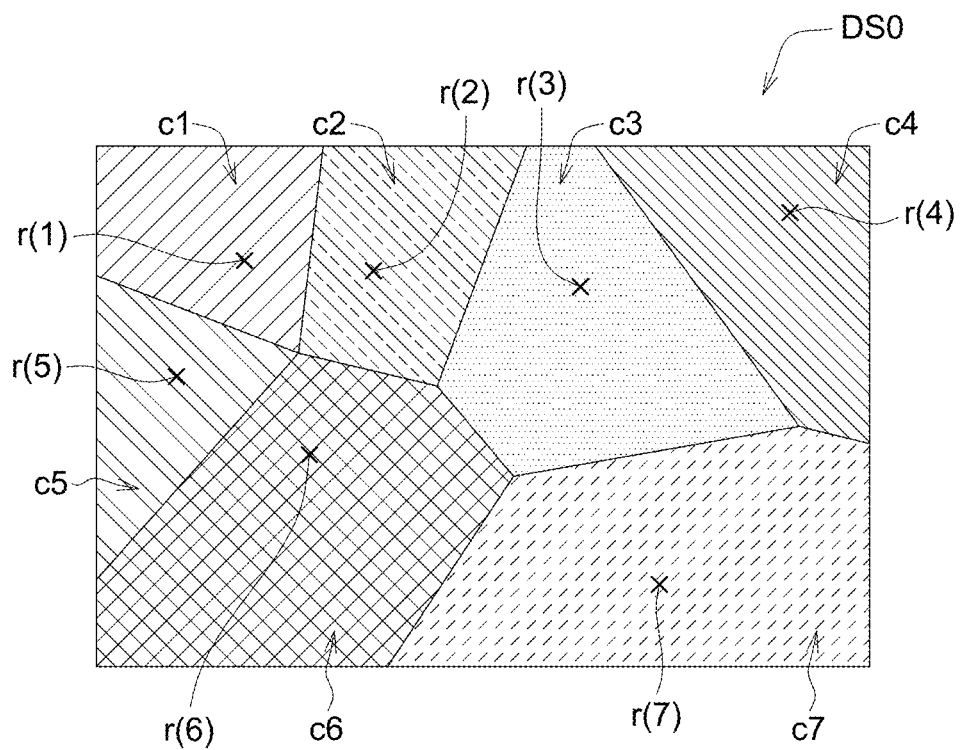
FIG. 1B is a schematic diagram of the data set in FIG. 1A being divided into several clusters.
Figure 1C:
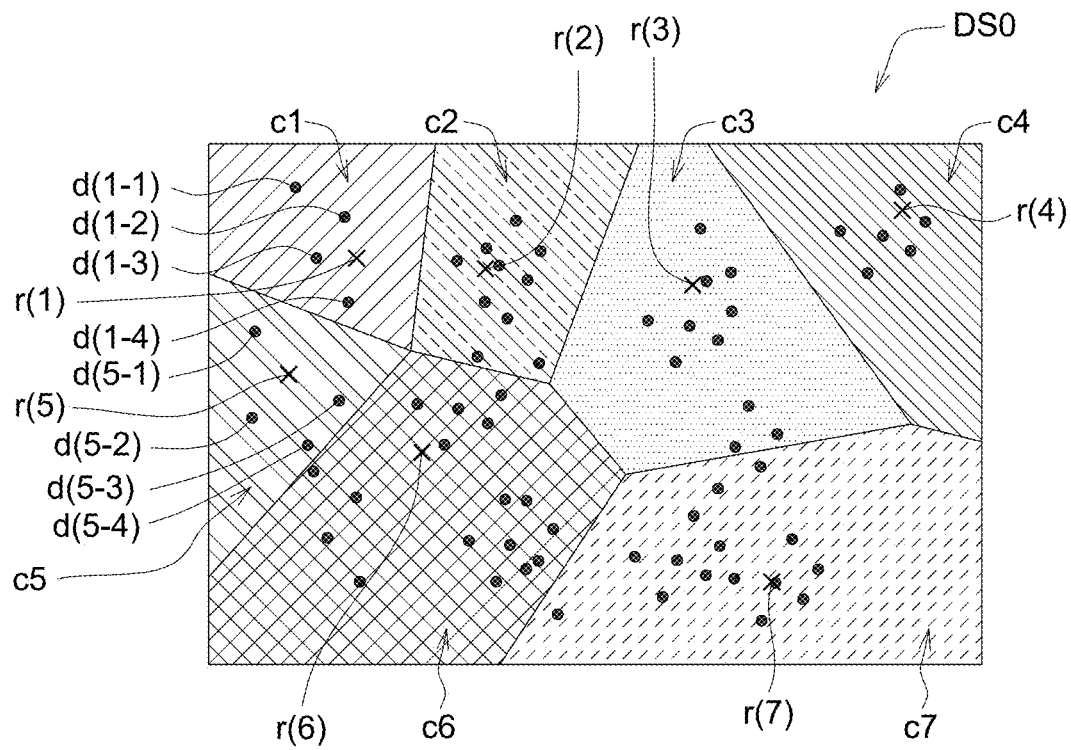
FIG. 1C is a schematic diagram of clusters, representative points and data points after the data set in FIG. 1A is divided.
Figure 2:
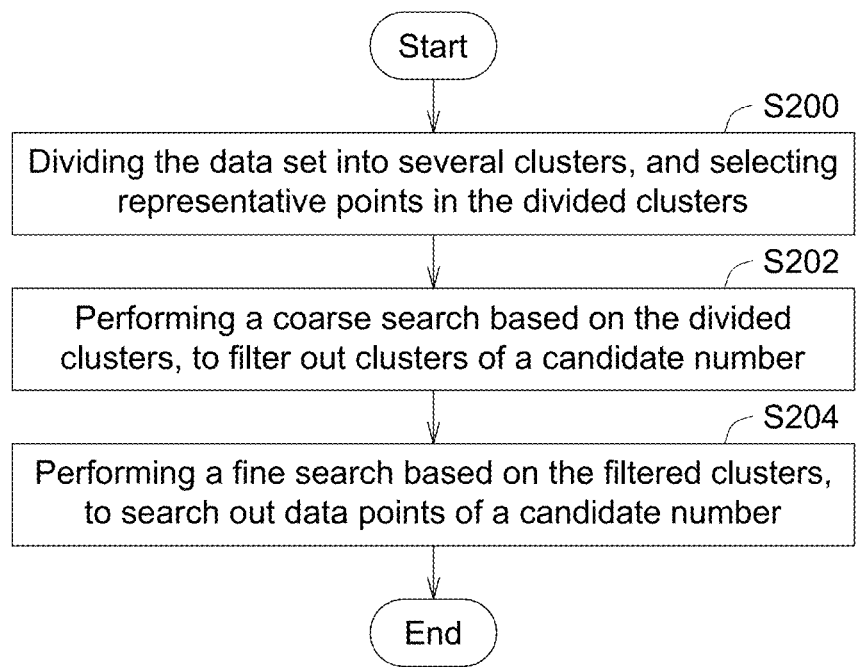
FIG. 2 is a flow chart of a filtered search method according to the first embodiment of the present disclosure.

FIG. 2 is a flow chart of the filtered search method according to the first embodiment of the present disclosure. As shown in FIG. 2, step S200 is firstly performed: dividing the data set DS0 into several clusters. Also refer to FIG. 1C, which is a schematic diagram of the data set DS0 in FIG. 1A being divided into several clusters. The data set DS0 is divided into cluster c1 to cluster c7, for example. The dividing of the data set DS0 is performed based on a similarity of the data points of the data set DS0. Such as, data points $d(1-1)$~$d(1-4)$ with high similarity to each other, belong to the same cluster c1. Furthermore, data points $d(5-1)$~$d(5-4)$ with high similarity to each other, belong to the same cluster c5. Moreover, the number and distribution density of data points covered by each of the clusters c1~c7 may be different. Such as, cluster c6 covers a larger number of data points, and cluster c4 covers a smaller number of data points.

Moreover, step S200 further includes: selecting or designating a representative point within each of the clusters c1~c7 after dividing, e.g., cluster c1 has a representative point r(1), cluster c2 has a representative point r(2), and cluster c3 has a representative point r(3), etc. These representative points r(1)~r(7) may be selected from existing data points within clusters c1~c7. Alternatively, other than the existing data points, additional virtual points are added as representative points (e.g., the virtual points do not overlap with the existing data points). The divided clusters c1~c7 shown in FIG. 1B form a Vornonoi Diagram. Moreover, referring to FIG. 1C, which is a schematic diagram of clusters c1~c7, representative points r(1)~r(7) and data points after the data set DS0 in FIG. 1A is divided. The divided cluster c1 includes data points d(1-1)~d(1-4), which correspond to the existing four data points d(1)~d(4) in FIG. 1A. The cluster c1 has a representative point r(1), and the representative point r(1) is a virtual point other than the existing data points d(1-1)~d(1-4) in cluster c1. That is, the representative point r(1) is disposed in addition to the data points d(1-1)~d(1-4), and the representative point r(1) does not overlap the data points d(1-1)~d(1-4).

Likewise, cluster c5 includes data points d(5-1)~d(5-4), which correspond to the existing four data points d(5)~d(8) in FIG. 1A. The cluster c5 has a representative point r(5), and the representative point r(5) is a virtual point other than the existing data points d(5-1)~d(5-4). The representative point r(5) does not overlap with the data points d(5-1)~d(5-4). Similarly, the representative points r(2), r(3), r(4), r(6) and r(7) of other clusters c2, c3, c4, c6 and c7 are all virtual points other than the existing data points.

Next, step S202 is executed: performing a coarse search based on the clusters c1~c7 which are divided. The coarse search may be referred to as a "filtering phase", which is a preliminary search based on the representative points r(1) ~r(7) of clusters c1~c7. Step S202 further includes: calculating the distances between each of the representative points r(1)~r(7) and the target point tg0. Also referring to FIG. 1D, which is a schematic diagram of the distances between representative points r(1)~r(7) and the target point tg0. The representative point r(1) of cluster c1 has a distance dst1 from the target point tg0, the representative point r(2) of cluster c2 has a distance dst2 from the target point tg0, etc., the other clusters c3, c4, c5, c6 and c7 have representative points r(3), r(4), r(5), r(6) and r(7) with distances dst3, dst4, dst5, dst6 and dst7 from the target point tg0 respectively. Step S202 may perform a coarse search based on the above distances dst1~dst7. Also referring to FIG. 1E, which is a schematic diagram of filtering out several clusters by the coarse search. The distance dst1, the distance dst2, the distance dst5, and the distance dst6 are shorter, hence a coarse search filters out the clusters c1, c2, c5, and c6 with a candidate number denoted as "m", where the candidate number m is equal to "4".

Next, step S204 is executed: performing a fine search according to the clusters c1, c2, c5 and c6 which are filtered. In this embodiment, the fine search is performed on all data points in the filtered clusters c1, c2, c5 and c6, so as to find one or more data points closest to the target point tg0. For example, calculating the distances between all the data points d(1-1)~d(1-4) in the filtered cluster c1 and the target point tg0, so as to find one or more data points closest to the target point tg0 in the cluster c1. Similarly, for all the data points d(2-1)~d(2-10) in the filtered cluster c2, their distances from the target point tg0 are calculated to search for one or more which are the closest. By analogy, the closest one or more of the data points d(5-1)~d(5-4) in the filtered cluster c5 are searched based on their respective distances from the target point tg0. According to the distances between all the data points d(6-1)~d(6-17) and the target point tg0 in the filtered cluster c6, one or more data points closest to the target point tg0 are searched.

Figure 1D:
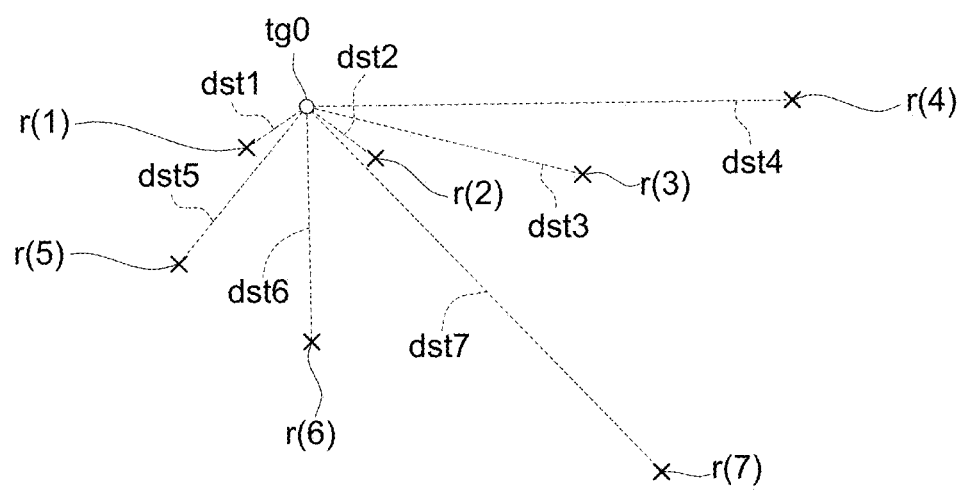
FIG. 1D is a schematic diagram of the distances between representative points and the target point.
Figure 1E:
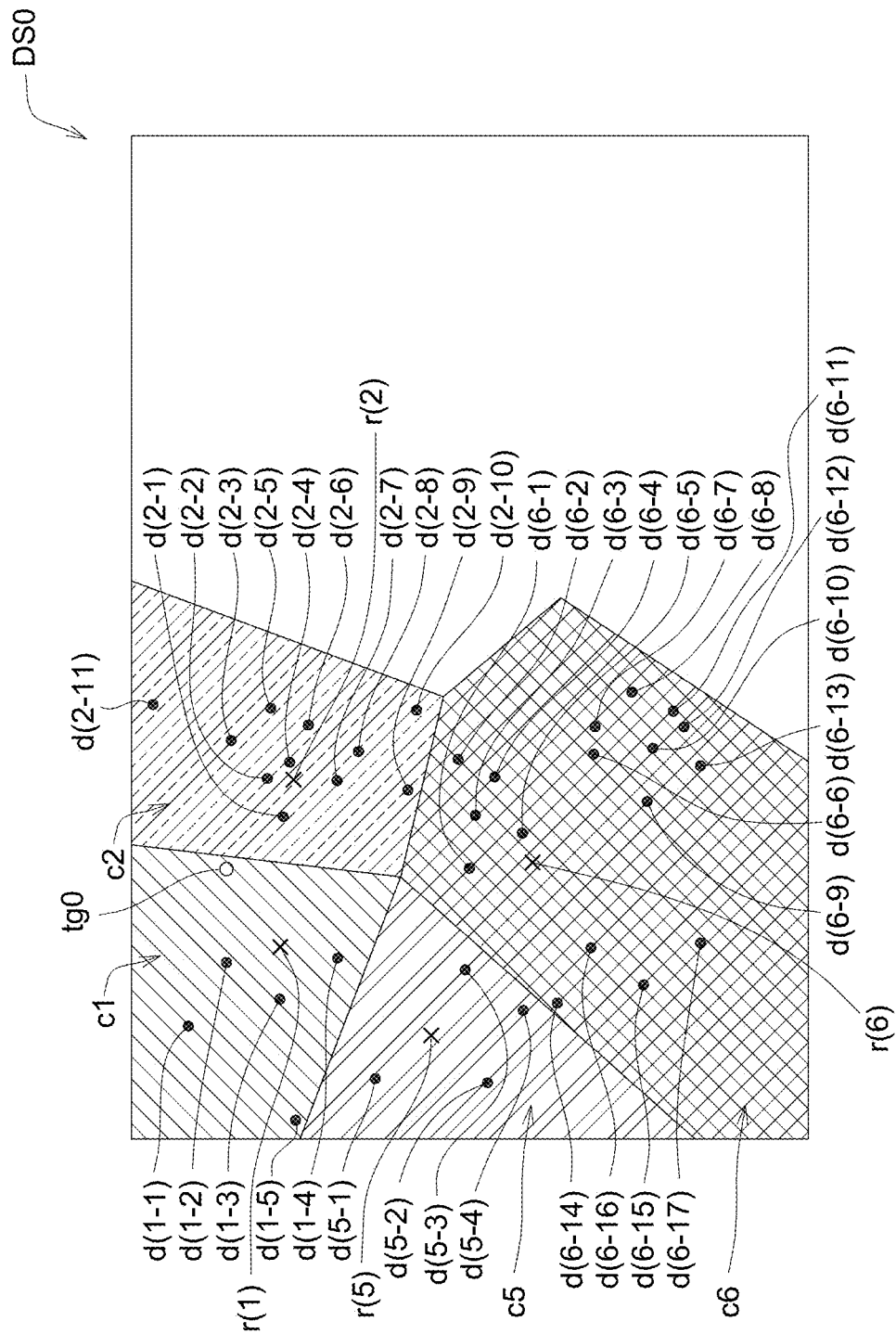
FIG. 1E is a schematic diagram of filtering out several clusters by the coarse search.
Figure 1F:
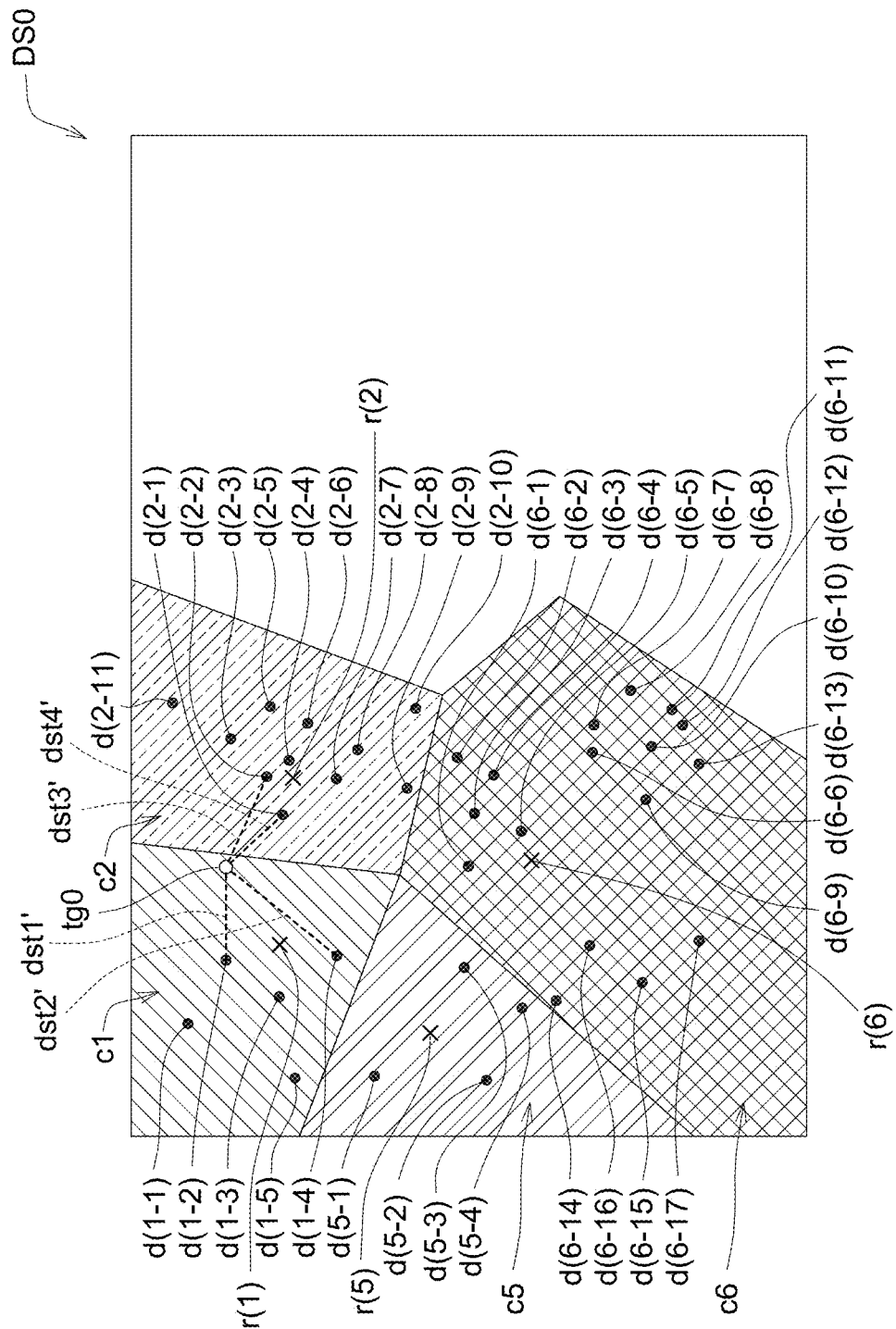
FIG. 1F is a schematic diagram of fine search to search one or more data points closest to the target point.

Also refer to FIG. 1F, which is a schematic diagram of fine search to search one or more data points closest to the target point tg0. The distance dst1' between the data point d(1-2) in the filtered cluster c1 and the target point tg0, the distance dst2' between the data point d(1-4) and the target point tg0, and in the cluster c2, the distance dst4' between data point d(2-1) and the target point tg0, and the distance dst3' between the data point d(2-2) and the target point tg0, are small, hence the fine search searches out the four data points d(1-2), d(1-4), d(2-1) and d(2-2) closest to the target point tg0. In other words, a candidate number denoted as "k" of data points are searched out by the fine search, where the candidate number k is equal to "4".

Figure 3:
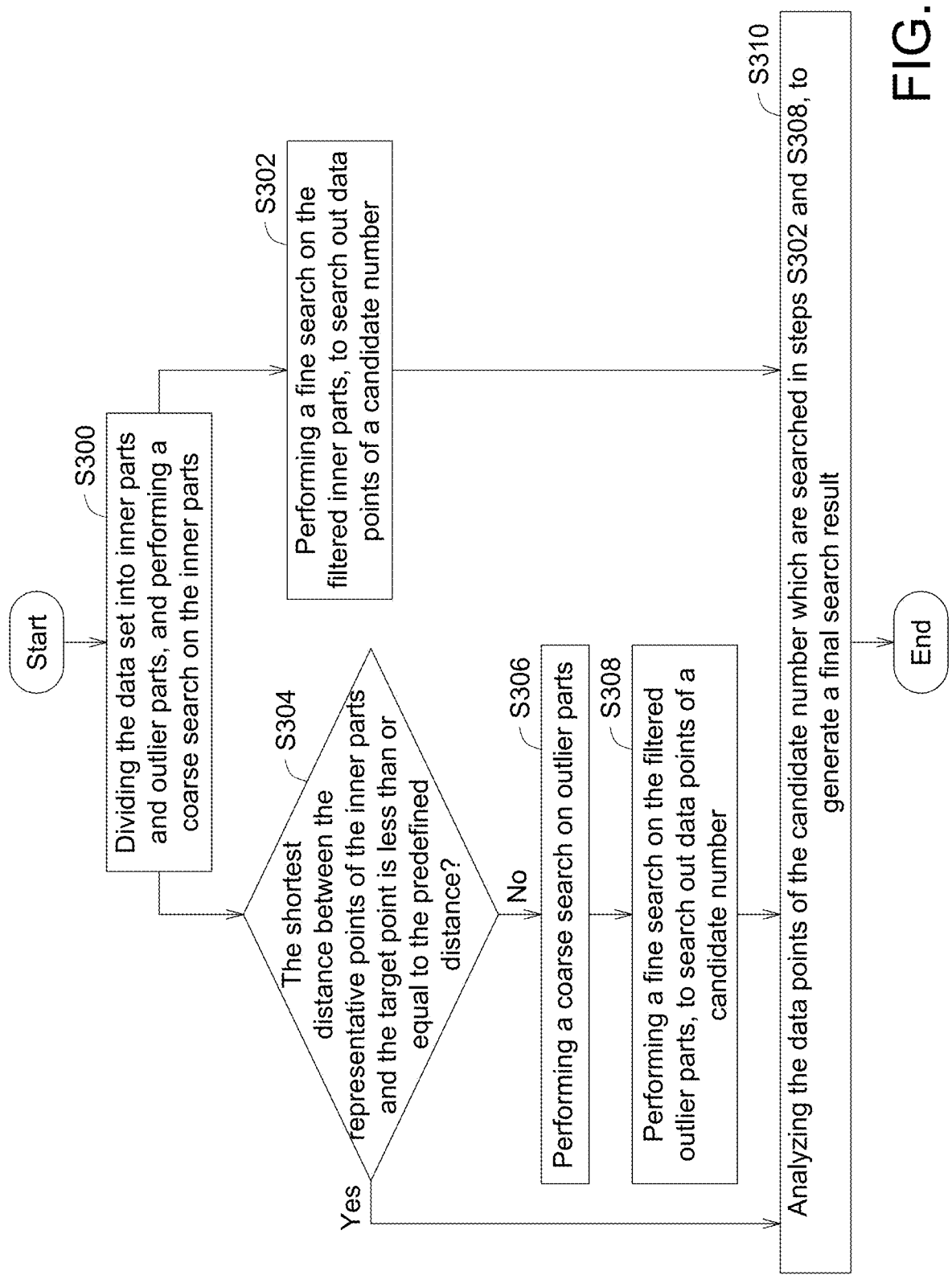
FIG. 3 is a flow chart of a filtered search method according to the second embodiment of the present disclosure.
Figure 4A:
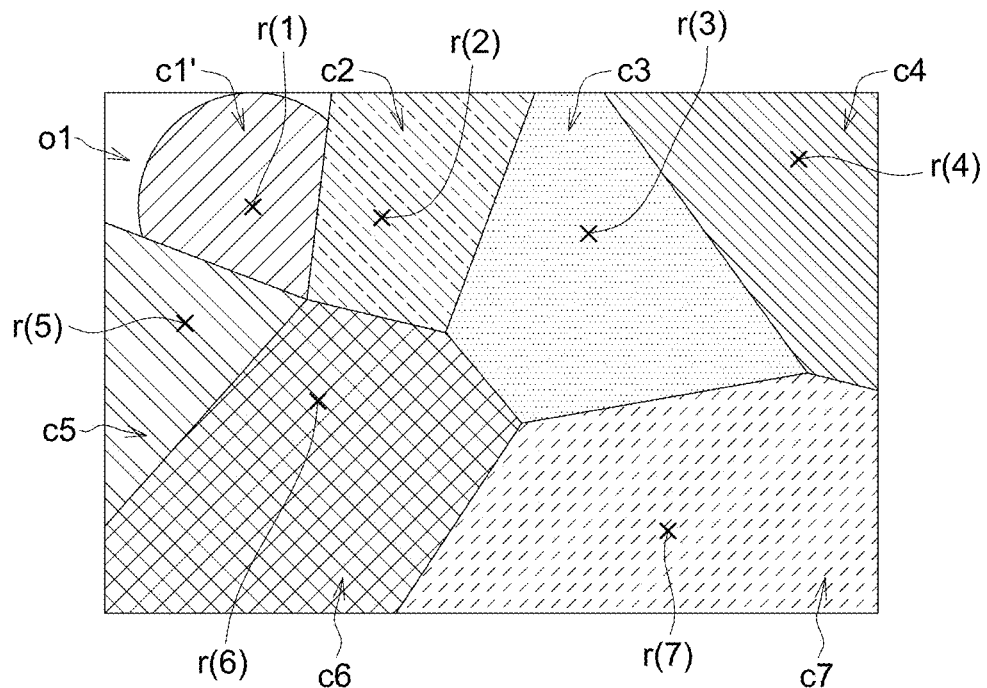
FIG. 4A is a schematic diagram of an example in which the data set is divided into an inlier part and an outlier part.

FIG. 3 is a flow chart of a filtered search method according to the second embodiment of the present disclosure. As shown in FIG. 3, step S300 is firstly performed: dividing the data set DS0 into an inlier part and an outlier part according to the distribution density of data points. Also referring to FIG. 4A, which is a schematic diagram of an example for the data set DS0 divided into an inlier part and an outlier part, which may be compared with the data set DS0 in FIGS. 1B and 1C. The data set DS0 in FIG. 1B has not been divided into an inlier part and an outlier part, and according to the distribution density of the data points d(1-1), d(1-2), d(1-3) and d(1-4) of cluster c1 in FIG. 1C, the cluster c1 may be divided into an inlier part c1' and an outlier part o1 in FIG. 4A. The distribution density of the inlier part c1' is larger, and the inlier part c1' covers all the data points d(1-1), d(1-2), d(1-3) and d(1-4) in the cluster c1. On the other hand, the distribution density of the outlier part o1 is smaller, and the outlier part o1 does not cover any data points. The example in FIG. 4A is only to divide the cluster c1 into the inlier part c1' and the outlier part o1 in FIG. 4A, while the other clusters c2~c7 maintain their original ranges.

Figure 4B:
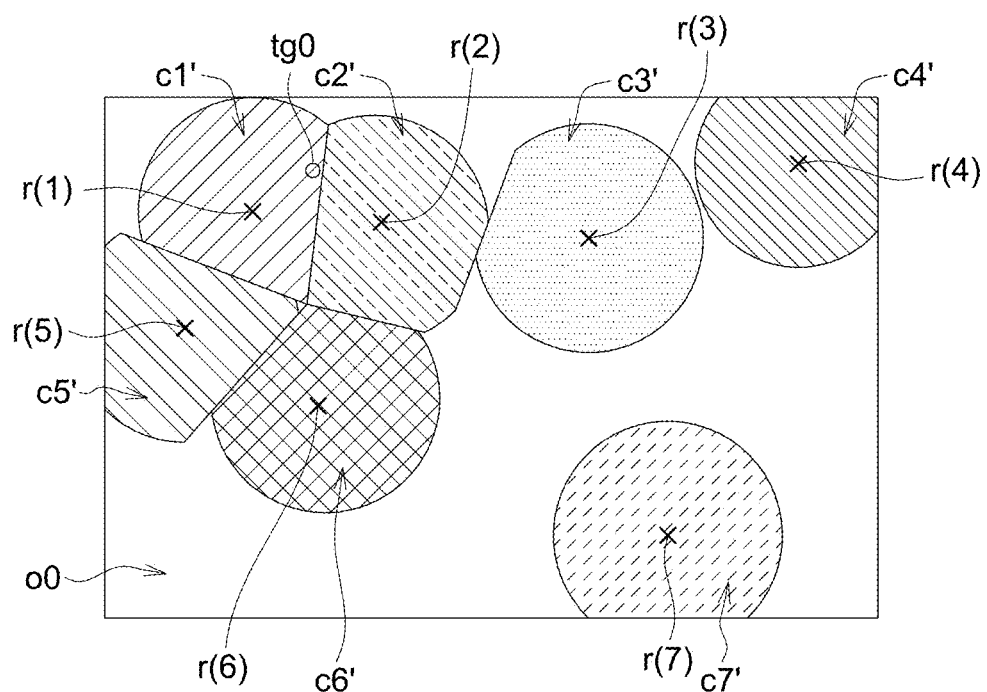
FIG. 4B is a schematic diagram of another example in which the data set is divided into an inlier part and an outlier part.

Also referring to FIG. 4B, which is a schematic diagram of another example in which the data set DS0 is divided into an inlier part and an outlier part. Each of the clusters c1~c7 are divided to have an inlier part. For example, clusters c1~c7 respectively have inlier parts c1'~c7'. The inlier parts c1'~c7' may be referred to as "constrained clusters".

The parts other than the above-mentioned inlier parts c1'~c7' are referred to as the outlier part o0. The distribution density of the inlier part c1'~c7' is relatively high, which may cover all or most of the data points. The distribution density of the outlier part o0 is smaller, and it may cover a small number of data points (or not any data points are covered).

Figure 4C:
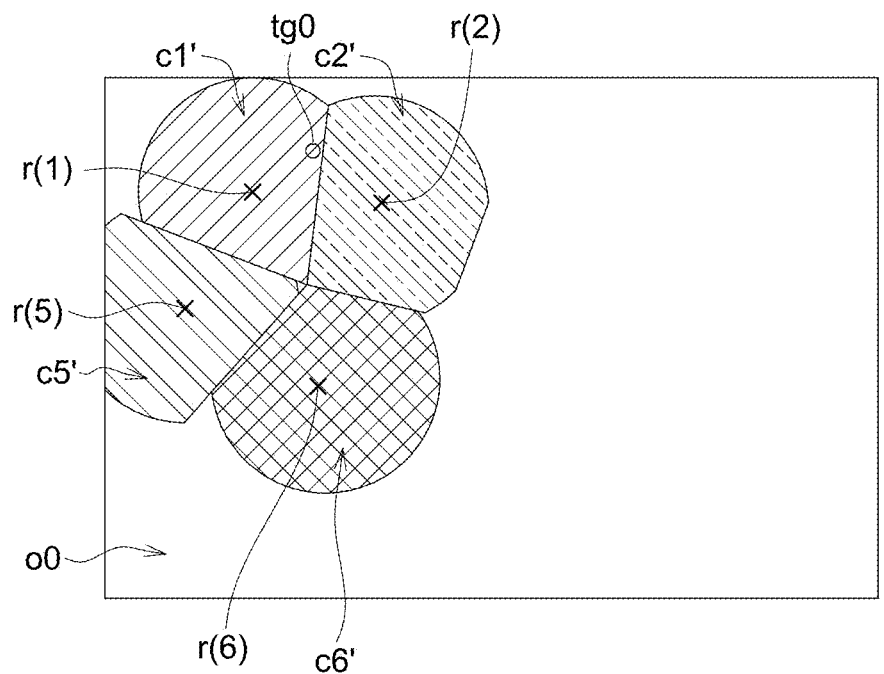
FIG. 4C is a schematic diagram of filtering out several inlier parts by a coarse search.

Furthermore, step S300 further includes: performing a coarse search for the inlier parts c1'~c7'. Also referring to FIG. 4C, which is a schematic diagram of filtering out several inlier parts by a coarse search. By the coarse search, four inlier parts c1', c2', c5' and c6' that are closest to the target point tg0 are filtered out from the inlier parts c1'~c7'. That is, the inlier parts c1'~c7' are narrowed down to the candidate number m1 which is equal to "4" by the coarse search, so as to filter out four inlier parts c1', c2', c5' and c6'. In this embodiment, the four inlier parts c1', c2', c5' and c6' closest to the target point tg0 are filtered out based on the distances between the representative points r(1)~r(7) of the inlier part c1'~c7' and the target point tg0.

Figure 4D:
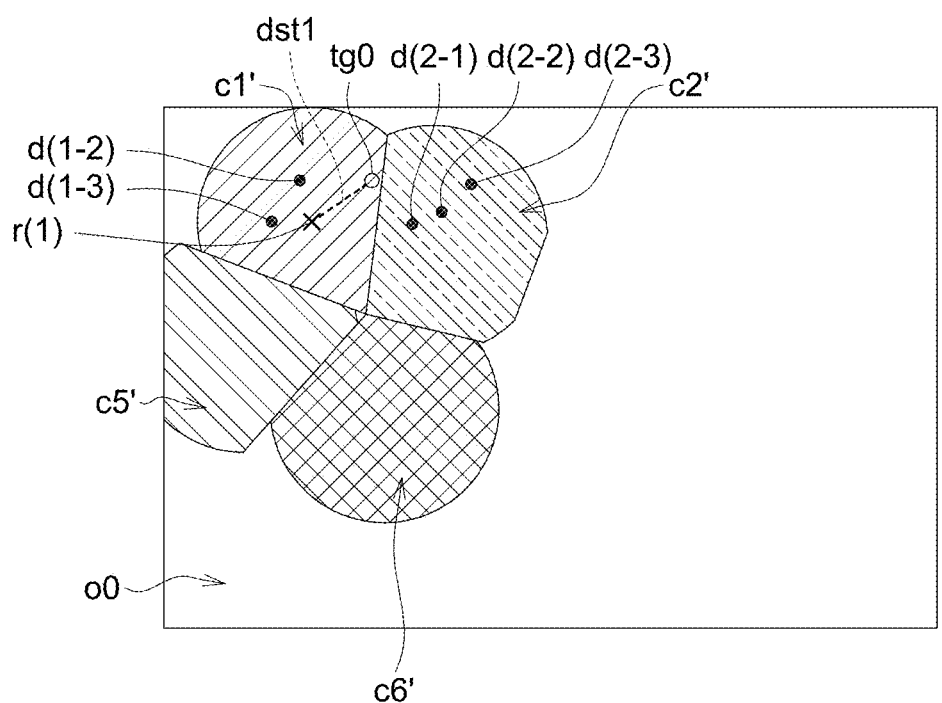
FIG. 4D is a schematic diagram of searching data points of candidate number from the inlier parts by the fine search.

Next, step S302 is executed: performing a fine search based on the filtered four inlier parts c1', c2', c5' and c6', so as to search out one or more data points that are closest to the target point tg0, from all data points in the inlier parts c1', c2', c5' and c6'. As shown in FIG. 4D, data points d(1-2), d(1-3), d(2-1), d(2-2) and d(2-3) of the candidate number k1 are searched out from the inlier parts c1', c2', c5' and c6', where the candidate number k1 is equal to "5".

Next, step S304 is executed: selecting a shortest distance d_min between the representative points r(1)~r(7) of the inlier part c1'~c7' and the target point tg0. As shown in FIG. 4D, the representative point r(1) of the inlier part c1' is closest to the target point tg0, and the distance dst1 between the representative point r(1) and the target point tg0 is the shortest, hence the distance dst1 is the short distance d_min. Furthermore, it is determined whether the shortest distance d_min is less than or equal to a predefined distance d_th. If the determination result is "No", step S306 is executed: performing a coarse search on the outlier part o0.

Figure 4E:
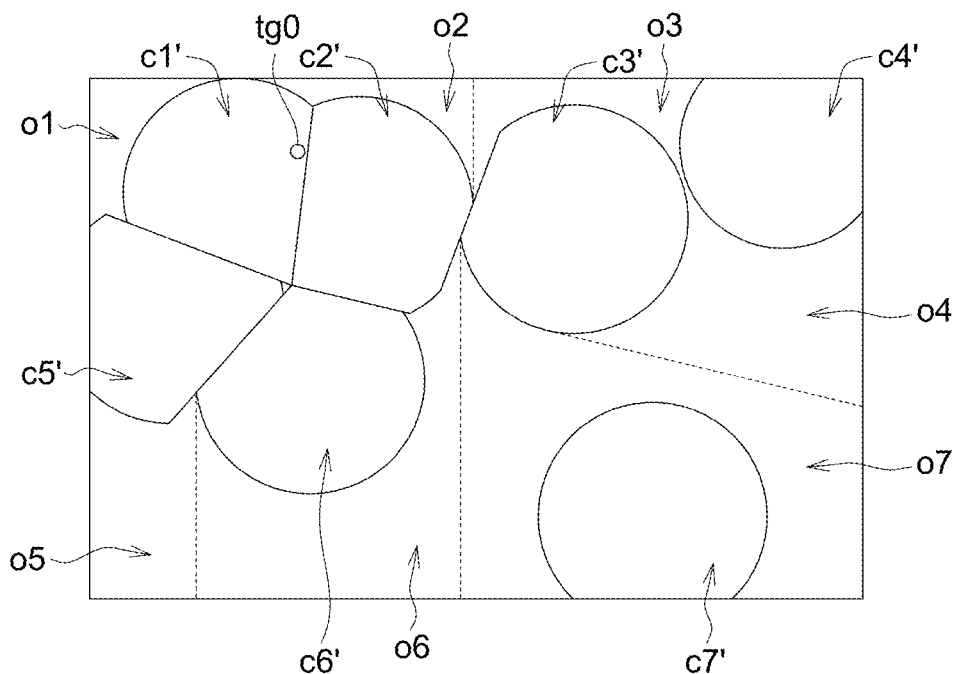
FIG. 4E is a schematic diagram of a coarse search performed on the outlier part.

The parts other than the inlier part c1'~c7' are referred to as the outlier part o0. Therefore, in step S306, the outlier part o0 is further divided into a plurality of outlier parts. Please also refer to FIG. 4E, which is a schematic diagram of a coarse search performed on the outlier part o0. The outlier part o0 is further divided into a plurality of clusters, forming seven outlier parts o1~o7. That is, each of the outlier parts o1~o7 is a cluster after dividing. The divided outlier parts o1~o7 may correspond to the inlier parts c1'~c7' one-to-one, alternatively, the outlier parts o1~o7 have no direct correspondence with the inlier parts c1'~c7'.

Figure 4F:
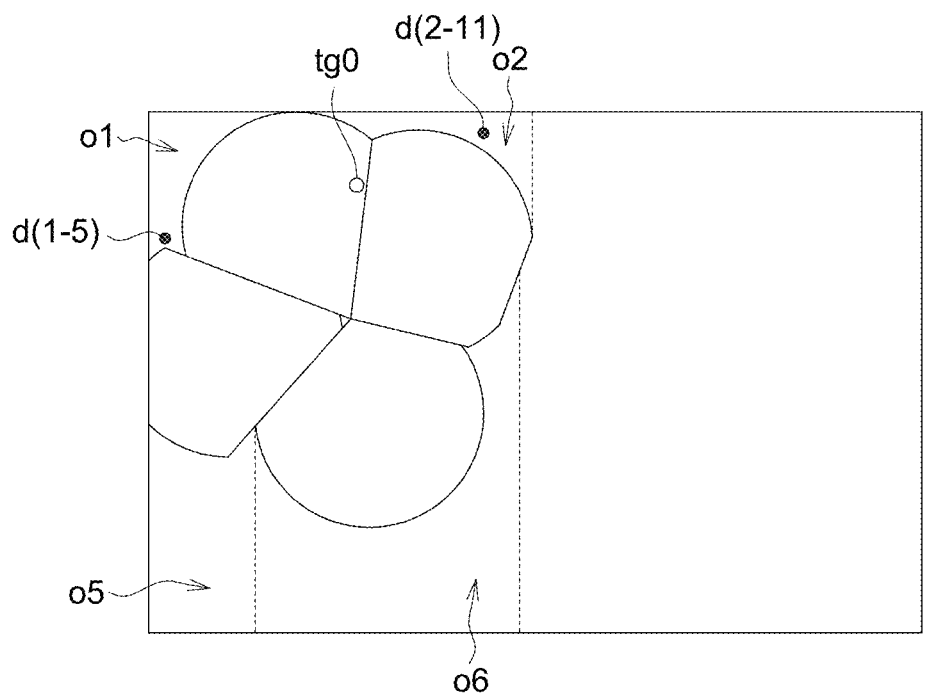
FIG. 4F is a schematic diagram of filtering out several outlier parts by the coarse search.

Furthermore, step S306 further includes: performing a coarse search on the divided outlier parts o1~o7, so as to filter out one or more that are closest to the target point tg0. Also referring to FIG. 4F, which is a schematic diagram of filtering out several outlier parts by the coarse search. The outlier parts o1, o2, o5 and o6 with the candidate number denoted as "m2", are filtered out by the coarse search, where the candidate number m2 is equal to 4.

Then, step S308 is executed: performing a fine search for the filtered outlier parts o1, o2, o5 and o6, and search for one or more which are closest to target point tg0 from all the data points covered by the outlier parts o1, o2, o5 and o6. Still referring to FIG. 4F, the data point d(1-5) covered by the outlier part o1 and the data point d(2-11) covered by the outlier part o2 are closest to the target point tg0. Therefore, data points d(1-5) and d(2-11) of the candidate number denoted as "k2", are selected by the fine search, where the candidate numbers k2 equals to 2.

Then, step S310 is executed: analyzing the data points d(1-2), d(1-3), d(2-1), d(2-2) and d(2-3) of the candidate numbers k1 obtained in step S302 and the data points d(1-5) and d(2-11) of the candidate number k2 obtained in step S308. For example, comparing the distances between the target point tg0 and the data points d(1-2), d(1-3), d(2-1), d(2-2), d(2-3), d(1-5) and d(2-11) of a total of candidate number(k1+k2). Furthermore, data points of a candidate number k are selected from the above data points of the candidate number(k1+k2) as the final search result. For example, data points d(1-2), d(1-3), and d(2-2) of the candidate number k are selected as the final search results, where the candidate number k is equal to 3.

On the other hand, if the determination result of step S304 is "Yes" (i.e., the shortest distance d_min is less than or equal to the predefined distance d_th), then step S310 is directly executed: analyzing the data points d (1-2), d(1-3), d(2-1), d(2-2) and d(2-3) of the candidate number k1, and comparing the distances between the above data points and the target point tg0, so as to select data points of the candidate number k as the final search result. For example, data points d(1-2) and d(2-1) are selected as the final search result, where the candidate number k is equal to 2. In other words, if the determination result in step S304 is "Yes", the processing of the outlier part o0 is skipped, and only the inlier parts c1'~c7' and the covered data points are filtered and searched.

In the filtered search method of the second embodiment shown in FIG. 3, the candidate numbers m1, m2, k1 and k2 may be determined based on the shortest distance d_min between the representative points r(1)~r(7) of the inlier part c1'~c7' and the target point tg0. Furthermore, the candidate numbers m1, m2, k1 and k2 may be determined regarding an outlier rate O_R and a utilization rate U_R.

More specifically, the outlier rate O_R has a definition as: a ratio of the number of data points covered by the outlier parts o1~o7 to the number of all data points in the data set DS0. Furthermore, the utilization rate U_R has a definition as: the probability of actually utilizing the outlier parts o1~o7 when executing the filtered search method(i.e., the probability of the ground truth falling within the outlier parts o1~o7). The utilization rate U_R may be positively related to the outlier rate O_R. As shown in Table 1, the so-called "BigANN" type data set DS0 is divided to obtain the inlier part and the outlier part of several clusters. When the outlier rate O_R of the outlier parts of BigANN is 8.5%, the utilization rate U_R of the outlier parts is 3.2%. When the outlier rate O_R of the outlier parts of BigANN increases to 15%, the utilization rate U_R of the outlier parts correspondingly increases to 7.4%. Similarly, as shown in Table 2, the so-called "DEEP" type data set DS0 is divided to obtain the inlier parts and the outlier parts of several clusters. When the outlier rate O_R of the outlier parts of DEEP is 8.5%, the utilization rate U_R of the outlier parts is 3.492%. When the outlier rate O_R of the outlier parts of DEEP increases to 15%, the utilization rate U_R of the outlier parts increases correspondingly to 7.043%.

According to the data in Table 1 and Table 2, the utilization rate U_R of the outlier parts is obviously lower than the outlier rate O_R. Therefore, the filtered search method of the present disclosure may search the outlier parts based on a lower search cost, which may effectively reduce the overall search costs.

TABLE 1

| (BigANN) | |
| --- | --- |
| Outlier rate O_R | Utilization rate U_R |
| 8.5% | 3.2% |
| 15% | 7.4% |

TABLE 2

| (Deep) | |
| --- | --- |
| Outlier rate O_R | Utilization rate U_R |
| 8.5% | 3.492% |
| 15% | 7.043% |

Based on the above, when the utilization rate U_R of the outlier parts is extremely low, the outlier parts may be processed based on a lower search cost. In one example, the outlier parts may be directly skipped without any processing (i.e., the outlier parts are not searched). For example, in step S304 of FIG. 3, if it is determined that the shortest distance d_min is less than or equal to the predefined distance d_th, then step S306 (i.e., coarse search of the outlier parts) and step S308 (i.e., fine search of the outlier parts) are skipped, hence step S310 is directly executed. In other words, the candidate number m2 for the coarse search in the outlier parts is set as "0", as shown in equation (1). Skipping the outlier parts without any processing, may significantly reduce the search cost, but may affect the search accuracy.

$$m2 = 0 \tag{1}$$

In another example, if it is determined that the shortest distance d_min is less than or equal to the predefined distance d_th, the candidate numbers m2 for the coarse search in the outlier parts may be set as much smaller than the candidate number m1 for the coarse search in the inlier parts, as shown in equation (2).

$$m2 \ll m1 \tag{2}$$

In yet another example, the search cost of the outlier parts may be determined based on the difficulty of the filtered search. Referring also to FIG. 1D, a difficulty level D_L may be defined based on the distances dst1~dst7 between the representative points r(1)~r(7) of the clusters c1~c7 and the target point tg0 respectively. The difficulty level D_L is a value positively related to the distances dst1~dst7. When the values of distances dst1~dst7 are smaller(i.e., the distances are shorter), the value of difficulty level D_L is smaller(i.e., indicating that the difficulty of filtering search is lower). On the contrary, when the values of distances dst1~dst7 are larger, the value of difficulty level D_L is larger. As shown in Table 3, when the outlier rate O_R of the outlier parts is 8.5%, difficulty levels D_L of different values correspond to utilization rates U_R of different values. For example, when the difficulty level D_L is 0~10%, the utilization rate U_R of the outlier parts of the BigANN data set DS0 is 0.00002. When the difficulty level D_L is 70%~80%, the utilization rate U_R of the outlier parts of the BigANN data set DS0 is 0.032.

TABLE 3

| Difficulty level D_L | utilization rate U_R of outlier parts for BigANN data set | utilization rate U_R of outlier parts for Deep data set |
|---|---|---|
| 0~10% | 0.0002 | 0 |
| 10%~20% | 0.0003 | 0 |
| 20%~30% | 0.0004 | 0 |
| 30%~40% | 0.0004 | 0.0001 |
| 40%~50% | 0.0019 | 0 |
| 50%~60% | 0.0039 | 0.0008 |
| 60%~70% | 0.012 | 0.0031 |
| 70%~80% | 0.032 | 0.0121 |
| 80%~90% | 0.0686 | 0.0564 |
| 90%~100% | 0.2021 | 0.2767 |

Furthermore, the candidate numbers m1, m2, k1 and k2 are adjusted according to the value of the difficulty level D_L. Such as, if the difficulty level D_L has a larger value, which means that the difficulty of the filtered search is higher, then the candidate numbers m2 may be set as a higher value.

In summary, the filtered search method of the present disclosure may be adapted to data sets with large-scale and improves search efficiency. The filtered search method of the present disclosure has many advantages and effects, e.g., certain clusters can be further divided into inlier parts and outlier parts based on the existing cluster structure. Respective inlier parts and the outlier parts are selectively searched, which may improve the search efficiency. Moreover, the search cost of the outlier parts may be reduced by adjusting the candidate numbers m1, m2, k1 and k2. In addition, not any additional search cost is required during the filtered search process.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A filtered search method, for performing a search in a data set, and the data set comprises a plurality of data points, and the filtered search method comprising:
dividing the data set into a plurality of clusters based on a similarity of the data points;
dividing each of the clusters into an inlier part and an outlier part based on a distribution density of the data points;
performing a coarse search on all of the inlier parts, to filter out the inlier parts of the first candidate number;
designating a representative point in each of the clusters;
calculating a first distance between each of the representative points and a target point;
obtaining a difficulty level of each of the clusters for the search based on each of the first distances, wherein each of the difficulty levels of the clusters is a value positively related to the first distance;
setting a first candidate number and a second candidate number based on the difficulty level of each of the clusters;
performing a fine search on the inlier parts of the first candidate number, to search the data points of the second candidate number; and
obtaining a search result used for applications of similarity search based on the data points of the second candidate number;
wherein the data points of the second candidate number represented by the search result are close to the target point.

2. The filtered search method according to claim 1, wherein the step of performing the coarse search on all of the inlier parts comprising:
designating a representative point in each of the clusters;
calculating a first distance between each of the representative points and the target point; and
selecting the inlier parts of the first candidate number based on the first distance.

3. The filtered search method according to claim 2, wherein the step of performing the fine search on the inlier parts of the first candidate number comprising:

calculating a second distance between each of the data points covered by the inlier parts of the first candidate number and the target point; and selecting the data points of the second candidate number from a coverage of the inlier parts of the first candidate number based on the second distance.

4. The filtered search method according to claim 2, wherein each of the representative points is one of the data points, or a virtual point other than the data points.

5. The filtered search method according to claim 1, wherein the outlier parts have a utilization rate and an outlier rate, and the difficulty levels are related to the utilization rate and the outlier rate.

6. The filtered search method according to claim 2, further comprising:

selectively performing a coarse search on the outlier parts, to filter out the outlier parts of a third candidate number.

7. The filtered search method according to claim 6, further comprising:

performing a fine search on the outlier parts of the third candidate number, to search the data points of a fourth candidate number; and obtaining the search result based on the data points of the second candidate number and the fourth candidate number.

8. The filtered search method according to claim 6, wherein the first distances comprise a shortest distance, and when the shortest distance is less than or equal to a predefined distance, the third candidate number is set as "0", and the search result is obtained based on the data points of the second candidate number.

9. The filtered search method according to claim 8, wherein when the shortest distance is less than or equal to the predefined distance, the third candidate number is set as smaller than the first candidate number.

* * * * *